United States Patent
Takahashi et al.

(10) Patent No.: US 7,014,192 B2
(45) Date of Patent: Mar. 21, 2006

(54) MULTISTAGE SHAFT SEALING APPARATUS

(75) Inventors: Hidekazu Takahashi, Sakado (JP); Takashi Yanagisawa, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/173,686

(22) Filed: Jun. 18, 2002

(65) Prior Publication Data

US 2003/0006561 A1    Jan. 9, 2003

(30) Foreign Application Priority Data

Jun. 21, 2001    (JP)    .............................. 2001-187616

(51) Int. Cl.
*F16J 15/54*    (2006.01)

(52) U.S. Cl. .................... 277/361; 277/365; 277/367; 277/408

(58) Field of Classification Search ................ 277/361, 277/365, 367, 369, 408
See application file for complete search history.

(56) References Cited

U.S. PATENT DOCUMENTS

| | | | | |
|---|---|---|---|---|
| 2,951,448 A | * | 9/1960 | Rushing ...................... 415/175 |
| 3,179,422 A | * | 4/1965 | Phillips ....................... 277/361 |
| 3,334,905 A | * | 8/1967 | Horwitz ...................... 277/365 |
| 3,360,272 A | * | 12/1967 | Blom .......................... 277/348 |
| 3,588,124 A | * | 6/1971 | Guinard ....................... 277/387 |
| 3,813,103 A | * | 5/1974 | Wiese .......................... 277/401 |
| 3,874,676 A | * | 4/1975 | Taylor et al. ................ 277/422 |
| 4,013,297 A | * | 3/1977 | Smith ......................... 277/365 |
| 4,964,646 A | * | 10/1990 | Boster ......................... 277/365 |
| 5,217,233 A | * | 6/1993 | Pecht et al. .................. 277/306 |
| 5,529,315 A | * | 6/1996 | Borrino et al. ............. 277/352 |
| 5,718,560 A | * | 2/1998 | Lorenzen ..................... 415/47 |
| 5,954,341 A | * | 9/1999 | Ringer et al. ................ 277/361 |
| 6,039,320 A | * | 3/2000 | MacDonald ................ 277/370 |
| 6,481,720 B1 | * | 11/2002 | Yoshida et al. ............. 277/400 |
| 6,508,472 B1 | * | 1/2003 | Omiya et al. ............... 277/408 |

* cited by examiner

*Primary Examiner*—Chuck Y. Mah
*Assistant Examiner*—Michael J Kyle
(74) *Attorney, Agent, or Firm*—Jacobson Holman PLLC

(57) ABSTRACT

A plurality of seal units are provided between a seal housing and a rotating shaft. An inside seal unit, an outside seal unit, and at least one pair of intermediate seal units are aligned in an axial direction. The inside seal unit contacts fluid to be sealed. The outside seal unit contacts the atmosphere. The intermediate seal units are located between the inside seal unit and the outside seal unit. A plurality of chambers are defined by each of seal units. An intermediate liquid is supplied to the chambers. A pressure in an inside chamber is maintained lower than a pressure of the fluid to be sealed in a machine. Pressures in second and third chambers are maintained equal to or higher than the pressure of the fluid to be sealed.

5 Claims, 2 Drawing Sheets

MULTISTAGE SHAFT SEALING APPARATUS

FIELD OF THE INVENTION

This invention relates to a multistage shaft sealing apparatus, which is preferably used as a sealing means for a rotating part of industrial machines or the like, for sealing fluid of process liquid or the like, leakage of which is to be strictly controlled.

DESCRIPTION OF THE RELATED ART

A mechanical seal is widely used at a rotating part of industrial machines, as a means for sealing a space circumferentially between a rotating shaft and a stationary seal housing. For example, in a pump for process circulation, which is widely used for chemical plants, it is widely used for the purpose of avoiding leakage of a harmful process liquid. The mechanical seal is located in a space around the shaft between a stationary seal housing and the rotating shaft that penetrates an inner circumference of the housing, and stops leakage of fluid through the space around the shaft. Here a sealed slide face is formed by a seal ring at a stationary side as well as a seal ring at a rotating side, which are opposed in an axial direction and contact each other under a spring force. The seal ring at the stationary side is attached in a sealed state to a side of the seal housing. The seal ring at the rotating side is attached in a sealed state to a side of the rotating shaft.

FIG. 3 schematically shows an example of a shaft sealing apparatus as a related art. The shaft sealing apparatus is for strictly controlling leakage of a process liquid B to an atmosphere side A. In a space 103 around a shaft between a stationary seal housing 101 and a rotating shaft 102 that is located through an inner circumference of the housing, two pairs of seal units 110 and 120 are arranged. A chamber 103a is composed or bounded in the space 103 around the shaft by both seal units 110 and 120. The seal housing 101 has intermediate liquid passing holes 101a. Through one of the holes 101a, an intermediate liquid C, which has higher or lower pressure in comparison with a pressure of the process liquid B to be sealed, is supplied to the chamber 103a. Thereby the process liquid B is isolated from the atmosphere side A. Again, one part of the process liquid B in a machine is circulated via a flushing hole 101b, which is opened at a portion of the seal housing 101.

Each seal unit 110, 120 has a constitution as a mechanical seal. Seal rings 111, 121 at a stationary side are attached airtightly to an inner circumference of the seal housing 101. Seal rings 112, 122 at a rotating side are attached airtightly to a sleeve 104 of the rotating shaft 102. The seal rings 111, 121 at the stationary side and the seal rings 112, 122 at the rotating side contact each other by means of a force of one or more springs (not shown) so as to form sealed slide faces 110S, 120S. In the figure, one example is shown that each seal unit 110, 120 is located in a tandem seal. In another example, which is not shown in FIG. 3, the seal rings 111, 121 at the stationary side are symmetrically located at both sides of a common seal ring so as to be positioned at the rotating side in the axial direction, which form sealed slide surfaces 110S, 120S on both end faces of the seal ring at the rotating side in the axial direction so as to constitute a double seal.

However, problems are apt to take place in case of a shaft sealing apparatus having a tandem seal structure or a double seal structure as described above. First, if the intermediate liquid C, which has lower pressure than the pressure of the process liquid B, is in a chamber 103a, sliding load of the sealed slide surfaces 110S, 120S can be effectively reduced. This is caused by minimizing a differential pressure that acts on the mechanical seal 110 between the process liquid B in the machine and the intermediate liquid C in the chamber 103a, and a differential pressure that acts on the mechanical seal 120 between the pressure in the chamber 103a and the pressure of the atmosphere. However, the inboard process liquid B having a high pressure leaks to the chamber 103a having a relatively low pressure. Further, depending on the compositions of the process liquid B to be mixed with the intermediate liquid C, there is such a possibility as to deteriorate lubrication at the sealed slide surfaces 110S, 120S between the seal rings 111, 121 placed at the stationary side and the seal rings 112, 122 placed at the rotating side. This causes a rough slide surface and early abrasion and deteriorates sealing function.

Further, if the pressure in the chamber 103a is lower than that of the process liquid B and both mechanical seals 110, 120 are damaged, the process liquid B spouts together with the intermediate liquid C to the atmosphere A at the outside of the machine. Therefore, if the process liquid B is harmful, it may cause serious influence on the surroundings.

On the other hand, if the pressure of the intermediate liquid C is set to be higher than that of the process liquid B to be sealed in the machine, the process liquid B cannot pass through the chamber 103a into the atmosphere side A. Therefore, if the process liquid B is harmful, it may be effective means. However, on the contrary, there is such a possibility that the intermediate liquid C in the chamber 103a may leak inboard from the mechanical seal 110 so as to contaminate the process liquid B. Further, if the pressure of the intermediate liquid C is higher than that of the process liquid B, the differential pressure, which acts on the outside mechanical seal 120 between the intermediate liquid C and the atmosphere A, becomes large. Thereby, because sliding load of the sealed slide surface 120S becomes high, it may decrease lifetime of the seal by heat generation or by increasing of abrasion. In addition, generally in case of a shaft sealing apparatus having the tandem seal structure or the double seal structure as described above, the chamber 103a is formed single. Therefore, when at least one of the mechanical seals 110, 120 is damaged, the process liquid B may leak to the atmosphere side A.

An object of the invention is to provide a shaft sealing apparatus, which is preferably used as a means for sealing fluid wherein leakage thereof is strictly controlled.

A further object of the invention is to provide a shaft sealing apparatus, which avoids leakage of fluid to be sealed to an atmosphere side by maintaining function of at least one chamber even if some seal units such as mechanical seal units are damaged.

SUMMARY OF THE INVENTION

A multistage shaft sealing apparatus according to a preferred embodiment of the present invention comprises a seal housing, a rotating shaft provided into the seal housing, an inside seal unit, an outside seal unit and at least one intermediate seal unit. The inside seal unit is located near a machine. The outside seal unit is located far from the machine. One or more intermediate seal units are provided along the rotating shaft in the seal housing between the outside seal unit, and the inside seal unit. The inside seal unit contacts fluid to be sealed in the machine, the outside seal unit contacts the atmosphere. The intermediate seal units are located between the inside and outside seal units. One or more supply passages and one or more discharge passages are opened at the seal housing. The supply passages are provided for supplying an intermediate liquid to at least one chamber selected from a plurality of chambers bounded or defined by the seal units between the seal housing and the rotating shaft. The discharge passages are provided for discharging the intermediate liquid from the chamber. Each pressure in at least two chambers selected from a plurality of the chambers is maintained to be equal to or higher than a pressure of the fluid to be sealed.

A multistage shaft sealing apparatus according to another embodiment of the present invention further comprises such a feature that a pressure in an outermost chamber that is located nearest to the atmosphere is maintained lower than a pressure in one of the other chambers that are located nearer to the machine than the outermost chamber, and the pressure in the outermost chamber is higher than a pressure of atmosphere.

In a multistage shaft sealing apparatus according to a further embodiment of the invention, a pressure in an innermost chamber that is located nearest to the machine is maintained equal to or lower than a pressure of the fluid to be sealed in the machine, and a pressure in a chamber second nearest to the machine is maintained equal to or higher than a pressure of the fluid to be sealed in the machine.

DESCRIPTION OF THE PREFERRED EMBODIMENTS

Figure 1:
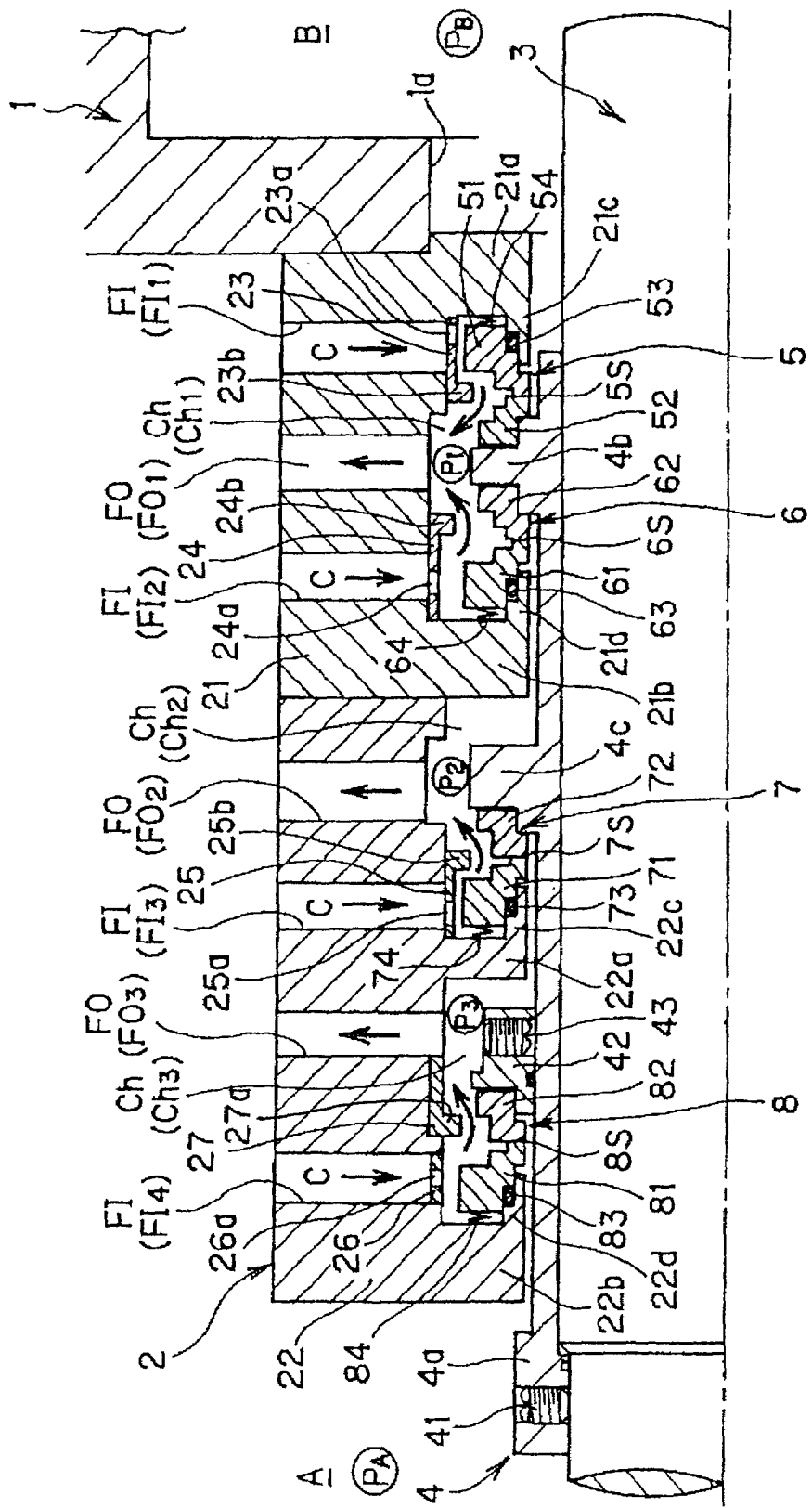
FIG. 1 is a semi-sectional view showing a multistage shaft sealing apparatus according to a preferred embodiment of the invention, by cutting with a plane passing through a shaft center.

FIG. 1 is a semi-sectional view showing a multistage shaft sealing apparatus according to a preferred embodiment of the invention, by cutting with a plane passing through a shaft center. Reference numeral 1 designates a pump housing in a pump for the process circulation purpose in chemical plants. Reference numeral 2 designates a seal housing, which is installed outside of a shaft hole 1a of the pump housing 1. Reference numeral 3 designates a rotating shaft, which extends through the inner circumference of the seal housing 2 into an inner part of the pump housing 1, which is called inside hereinafter, for the purpose of driving a pump mechanism not shown in the figures.

The seal housing 2 has a first housing member 21 at an inside portion and a second housing member 22 at an outside portion, which are continued or combined in a ringed state, and connected in an axial direction. The seal housing 2 has a predetermined axial length. A sleeve 4 is surrounded partly by the seal housing 2 and externally airtightly fitted to the rotating shaft 3. The sleeve 4 is fixed to the rotating shaft 3 by a means of plurality of setscrews 41. The setscrews 41 are circumferentially provided and screwed in a radial direction at an end 4a of the sleeve 4. The end 4a is located at an outer end portion exposed from the inside of the seal housing 2.

In a space around the shaft between the seal housing 2 and the sleeve 4 of the rotating shaft 3, plural seal units 5~8 are aligned in the axial direction. The seal units 5~8 are designed to constitute of mechanical seals for avoiding leakage of the process liquid B from the machine to the atmosphere A at an outside portion of the machine via a space formed around the shaft. In the space around the shaft, plural chambers Ch (Ch$_1$~Ch$_3$) are bounded or defined by the seal units 5~8, which are continued in the circumferential direction.

At the inner circumference near both ends in the axial direction of the first housing member 21 that constitutes the seal housing 2, a pair of inward flanges 21a, 21b and a pair of support cylinders 21c, 21d are formed. The support cylinders 21c, 21d extend from an inner circumference of the inward flanges 21a, 21b to each facing end. At the inner circumference of an intermediate position in the axial direction and the inner circumference near the outer end of the second housing member 22, a pair of inward flanges 22a, 22b and support cylinders 22c, 22d are formed. The support cylinders 22c, 22d extend from the inner circumference of the inward flanges 22a, 22b to the inside of the machine. An outward flange 4b and an outward flange 4c are formed at the sleeve 4. The outward flange 4b is located in position between the two inward flanges 21a, 21b of the first housing member 21. The outward flange 4c is located in position between the inward flange 21b of the first housing member 21 and the inward flange 22a of the second housing member 22. Further, a collar 42 is located between the two inward flanges 22a, 22b of the second housing member 22 while it is fixed on the sleeve 4 by setscrews 43.

The inside seal unit 5 is located nearest to the pump housing 1 among the plural seal units 5~8. The inside seal unit 5 is interposed between the inward flange 21a of the first housing member 21 and the outward flange 4b of the sleeve 4. The first intermediate seal unit 6 is located at a second position from the pump housing 1. The first intermediate seal unit 6 is interposed between the inward flange 21b of the first housing member 21 and the outward flange 4b of the sleeve 4. Further, the second intermediate seal unit 7 is located at a third position from the pump housing 1. The second intermediate seal unit 7 is interposed between the inward flange 22a of the second housing member 22 and the outward flange 4c of the sleeve 4. The outside seal unit 8 is located at the outermost position from the machine. The outside seal unit 8 is interposed between the inward flange 22b of the second housing member 22 and the collar 42.

In detail, the inside seal unit 5 has a non-rotating or stationary seal ring 51 at the stationary side and a seal ring 52 at the rotating side. The seal ring 51 at the stationary side is supported movably in the axial direction via a packing 53 to the outer circumference of the inside support cylinder 21c of the first housing member 21 within the seal housing 2. The seal ring 52 at the rotating side is held at an inside surface of the outward flange 4b of the sleeve 4 via a gasket not shown in the figures so as to be opposed to the seal ring 51 at the stationary side in the axial direction. Springs 54 are interposed between the seal ring 51 at the stationary side and the inward flange 21a of the housing member 21. Both seal rings 51, 52 contact with each facing end under a spring force of the springs 54 in the axial direction so as to form a sealed slide surface 5S, and perform shaft sealing function.

The first intermediate seal unit 6 is located at a second position from the side of the pump housing 1. The first intermediate seal unit 6 has a non-rotating seal ring 61 at the stationary side and a seal ring 62 at the rotating side. The seal ring 61 at the stationary side is supported movably in the axial direction via a packing 63 to the outer circumference of the outside support cylinder 21d of the first housing member 21 within the seal housing 2. The seal ring 62 at the rotating side is held via a gasket not shown in the figures at an outside surface of the outward flange 4b of the sleeve 4 so as to be opposed to the seal ring 61 at the stationary side in the axial direction. Springs 64 are interposed between the seal ring 61 at the stationary side and the inward flange 21b of the first housing member 21. Both seal rings 61, 62 contact with each facing end under a spring force of the springs 64 in the axial direction so as to form a sealed slide surface 6S, and perform shaft sealing function.

In addition, components which constitute the inside seal unit 5 and components which constitute the first intermediate seal unit 6 are arranged substantially symmetrically via the outward flange 4b of the sleeve 4.

The second intermediate seal unit 7 is located at a third position from the pump housing 1. The second intermediate seal unit 7 has a non-rotating seal ring 71 at the stationary side and a seal ring 72 at the rotating side. The seal ring 71 at the stationary side is supported movably in the axial direction via a packing 73 to the outer circumference of the inside support cylinder 22c of the second housing member 22 within the seal housing 2. The seal ring 72 at the rotating side is held via a gasket not shown in the figures at an outside surface of the outward flange 4c at the intermediate in the axial direction of the sleeve 4 so as to be opposed to the seal ring 71 at the stationary side in the axial direction. Springs 74 are interposed between the seal ring 71 at the stationary side and the inward flange 22a of the second housing member 22. Both seal rings 71, 72 contact with each facing end by a force of the springs 74 in the axial direction so as to form a sealed slide surface 7S, and perform shaft sealing function.

In addition, components constituting the second intermediate seal unit 7 and components constituting the first intermediate seal unit 6 are arranged in the same direction.

The outside seal unit 8 is located at the outermost position from the machine. The outside seal unit 8 has a non-rotating seal ring 81 at the stationary side and a seal ring 82 at the rotating side. The seal ring 81 at the stationary side is supported movably in the axial direction via a packing 83 at the outer circumference of the outside support cylinder 22d of the second housing member 22 within the seal housing 2. The seal ring 82 at the rotating side is held via a gasket not shown in the figures at an outside surface of the collar 42 that is to be installed on the sleeve 4 so as to be opposed to the seal ring 81 at the stationary side in the axial direction. Springs 84 are interposed between the seal ring 81 at the stationary side and the inward flange 22b of the second housing member 22. Both seal rings 81, 82 contact with each facing end by means of a force of the springs 84 in the axial direction so as to form a sealed slide surface 8S, and perform shaft sealing function.

In addition, components constituting the outside seal unit 8 and components constituting the first and second intermediate seal units 6, 7 are arranged in the same direction.

The first housing member 21 of the seal housing 2 has a pair of supply passages $FI_1$, $FI_2$ for an intermediate liquid and a discharge passage $FO_1$ for an intermediate liquid. These passages face the first chamber $Ch_1$, which is bounded or defined between the inside seal unit 5 and the first intermediate seal unit 6. Among these passages, the supply passage $FI_1$ is opened at the circumferential position of the seal ring 51 at the stationary side of the inside seal unit 5. The supply passage $FI_2$ is opened at the circumferential position of the seal ring 61 at the stationary side of the first intermediate seal unit 6. The discharge passage $FO_1$ is opened at the intermediate position in the axial direction of the first chamber $Ch_1$.

The second housing member 22 has a supply passage $FI_3$ for an intermediate liquid, a discharge passage $FO_2$ for an intermediate liquid, a supply passage $FO_4$ for an intermediate liquid, and a discharge passage $FO_3$ for an intermediate liquid. The supply passage $FI_3$ and the discharge passage $FO_2$ face the second chamber $Ch_2$, which is bounded or defined between the first intermediate seal unit 6 and the second intermediate seal unit 7. The supply passage $FI_4$ and the discharge passage $FO_3$ face the third chamber $Ch_3$, which is bounded between the second intermediate seal unit 7 and the outside seal unit 8. Among these passages, the supply passage $FI_3$ at the inside is opened at the outer circumferential position of the seal ring 71 at the stationary side of the second intermediate seal unit 7. The inside discharge passage $FO_2$ is opened nearer to the machine in comparison with the supply passage $FI_3$. Further, the outside supply passage $FI_4$ is opened at the outer circumferential position of the seal ring 81 at the stationary side of the outside seal unit 8. The discharge passage $FO_3$ is opened nearer to the machine in comparison with the supply passage $FI_4$.

In the first chamber $Ch_1$, an intermediate liquid C, such as appropriately pressurized turbine oil, is circulated and supplied from the outside via the supply passages $FI_1$, $FI_2$, and the discharge passage $FO_1$. Similarly in the second chamber $Ch_2$, the intermediate liquid C, such as appropriately pressurized turbine oil, is circulated and supplied, via the supply passage $FI_3$ and the discharge passage $FO_2$. Further, in the third chamber $Ch_3$, the intermediate liquid C, such as appropriately pressurized turbine oil, is circulated and supplied, via the supply passage $FI_4$ and the discharge passage $FO_3$.

Further, a pressurized circulating supply device and a cooling system, which are not shown in the figures, are provided with passages for circulating the intermediate liquid into each chamber $Ch_1$~$Ch_3$. In the passages for circulating the intermediate liquid into the first chamber $Ch_1$, a leaked liquid separation and collection device, which are not shown in the figures, is provided.

Figure 2:
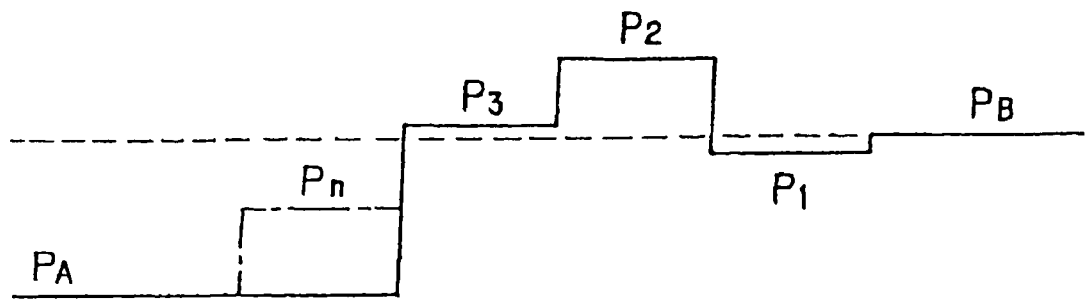
FIG. 2 is a diagram of the embodiment in FIG. 1, which shows relationship of the pressure from the process liquid in the machine to atmosphere at the outside of the machine.
Figure 3:
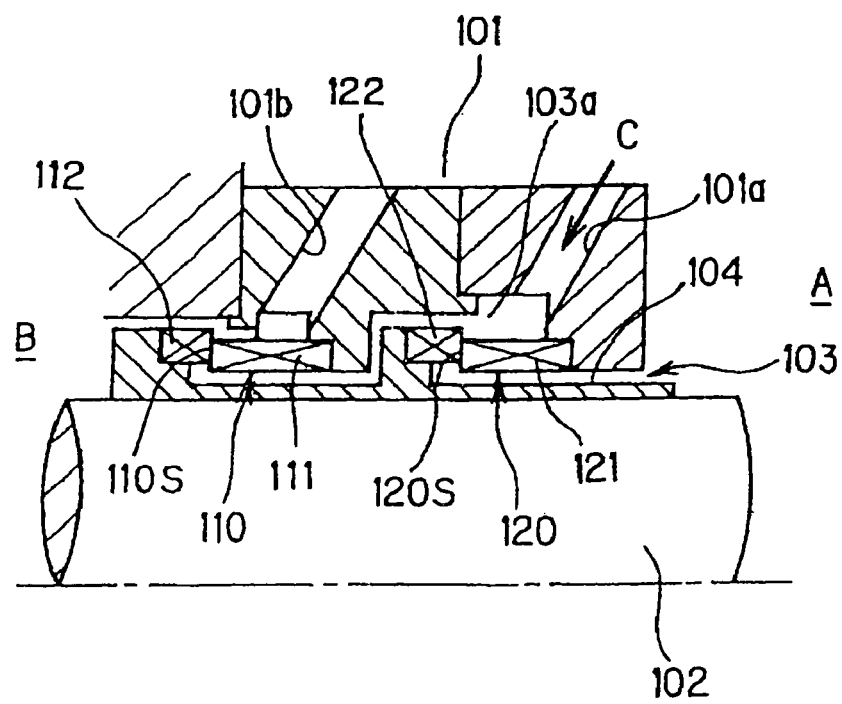
FIG. 3 is a semi-sectional view showing a multistage shaft sealing apparatus according to an example of the related art, by cutting with a plane passing through a shaft center.

FIG. 2 is a diagram showing a preferred relationship among pressures from the process liquid B in the machine to the atmosphere A at the outside of the machine. That is, because of circulation and supply of the intermediate liquid C, an internal pressure $P_1$ in the first chamber $Ch_1$ is maintained slightly lower than a pressure $P_B$ of the process liquid B in the machine. Further, an internal pressure $P_2$ in the second chamber $Ch_2$ is maintained higher than the pressure $P_B$ of the process liquid B in the machine. Further, an internal pressure $P_3$ of the third chamber $Ch_3$ is maintained lower than the internal pressure $P_2$ in the second chamber $Ch_2$ and higher than the internal pressure $P_B$ of the process liquid B.

At the inner circumferential surface of the first housing member 21, plugs 23, 24 are fixed to the first chamber $Ch_1$. At the inner circumferential surface of the second housing member 22, a plug 25 is fixed to the second chamber $Ch_2$ and plugs 26, 27 are fixed to the third chamber $Ch_3$. Among these, the plugs 23~26 are used for regulating supply flow of pressurized fluid into each chamber $Ch_1$~$Ch_3$ through orifice holes 23a~26a. Annular baffle plates 23b~25b are formed at the plugs 23~25, so that pressurized fluid detours to flow near the sealed slide surfaces 5S~7S of the seal units 5~7. Pressurized fluid flows from the supply passages $FI_1$~$FI_3$ into the first and second chambers $Ch_1$, $Ch_2$ via the orifice holes $23a$~$25a$. Further, in the third chamber $Ch_3$, a baffle plate $27a$ is formed at the plug 27, so that the pressurized liquid detours to flow near the sealed slide surface $8S$ of the outside seal unit 8.

According to the multistage shaft sealing apparatus of the embodiment constituted as above described, the inside seal unit 5 functions to seal and directly contacts the process liquid B to be sealed, which has a high pressure in the machine. The internal pressure $P_1$ in the first chamber $Ch_1$ that is bounded or formed between the inside seal unit 5 and the first intermediate seal unit 6 is slightly lower than the pressure $P_B$ of the process liquid B in the machine. Therefore, the intermediate liquid C, such as turbine oil, which is circulated and supplied into the first chamber $Ch_1$, does not leak from the inside seal unit 5 into the machine or the pump housing 1 so as to pollute the process liquid B. Further, the differential pressure ($P_B$–$P_1$) between the pressure $P_B$ in the machine and the internal pressure $P_1$ in the first chamber $Ch_1$ are small. Therefore, the surface pressure of the sealed slide surface $5S$ becomes small. Abrasion and heat generation can be reduced.

The internal pressure $P_1$ in the first chamber $Ch_1$ is slightly smaller than the pressure $P_B$ of the process liquid B in the machine. Therefore, there may be such a possibility as to slightly leak the process liquid B from the inside seal unit 5 to the first chamber $Ch_1$. However, the internal pressure $P_2$ in the second chamber $Ch_2$ that is located next to the first chamber $Ch_1$ via the first intermediate seal unit 6 in the axial direction is higher than the pressure $P_B$ of the process liquid B in the machine. Accordingly, the internal pressure $P_2$ is higher than the internal pressure $P_1$ in the first chamber $Ch_1$. Therefore, the process liquid B which enters into the first chamber $Ch_1$ does not further leak into the second chamber $Ch_2$. Further, it is unnecessary to enlarge the differential pressure ($P_2$–$P_1$) between the first chamber $Ch_1$ and the second chamber $Ch_2$, which acts on the first intermediate seal unit 6. Therefore, the surface pressure of the sealed slide surface $6S$ becomes small. Abrasion and heat generation can be reduced.

In addition, the process liquid B, which slightly leaks from the machine into the first chamber $Ch_1$ with a relatively low pressure via the inside seal unit 5, is discharged and circulated together with the intermediate liquid C such as turbine oil to be fed from the discharge passage $FO_1$. In this process, the process liquid B is separated and collected from the intermediate liquid C by means of the leaked liquid separation and collection device (not shown in the figure).

The internal pressure $P_2$ in the second chamber $Ch_2$ is higher than the pressure $P_B$ of the process liquid B in the machine. Further, the pressure $P_B$ of the process liquid B is high in itself. Therefore, the difference ($P_2$–$P_A$) in pressure between the second chamber $Ch_2$ and the atmosphere A becomes high. However, according to the multistage shaft sealing apparatus of the above-stated embodiment, at the outside of the second chamber $Ch_2$, the third chamber $Ch_3$ is provided, which is set at the pressure $P_3$ lower than the pressure $P_2$ of the second chamber $Ch_2$. Therefore, the differential pressure ($P_2$–$P_3$) and the differential pressure ($P_3$–$P_A$) become smaller than the difference ($P_2$–$P_A$) in pressure. Here the differential pressure ($P_2$–$P_3$) acts on the second intermediate seal unit 7 that functions as a seal between the second chamber $Ch_2$ and the third chamber $Ch_3$. The differential pressure ($P_3$–$P_A$) acts on the outside seal unit 8 that functions as a seal between the third chamber $Ch_3$ and atmosphere A at the outside of the machine. The difference in the pressure ($P_2$–$P_A$) is a difference in pressure between the second chamber $Ch_2$ and the atmosphere A. Therefore, each surface pressure of the sealed slide surfaces $7S$, $8S$ becomes small. Abrasion and heat generation can be reduced.

Further, even if all of the seal units 5~8 damage or loose their function, the process liquid B in the machine does not leak out through the chambers $Ch_1$~$Ch_3$ to the atmosphere A, as far as the pressure is maintained with the relationship as above described.

Through the supply passages $FI_1$, $FI_2$, the intermediate liquid C such as turbine oil is supplied to the first chamber $Ch_1$. Such intermediate liquid C is detoured by the baffle plates $23b$, $24b$ of the plugs 23, 24 so as to flow near the sealed slide surfaces $5S$, $6S$, from the outer circumferences of the seal rings 51, 61 at the stationary side of the inside seal unit 5 and the first intermediate seal unit 6, and then is discharged from the discharge passage $FO_1$. Therefore, the sealed slide surfaces $5S$, $6S$ are cooled by the flow of the intermediate liquid C and lubricated. As a result, the slide load is effectively decreased. Abrasion of the sealed slide surfaces $5S$, $6S$ and deformation by the slide heat generation is decreased. Further, decrement of the lifetime is reduced, which may be caused from partial abrasion by unbalanced contacts.

Similarly, in the second chamber $Ch_2$ and the third chamber $Ch_3$, the intermediate liquid C such as turbine oil is supplied through the supply passage $FI_3$ or the supply passage $FI_4$. Such intermediate liquid C is detoured by the baffle plate $25b$ of the plug 25 or the baffle plate $27a$ of the plug 27 so as to flow near the outer circumference of the sealed slide surface $7S$ or the sealed slide surface $8S$, from the outer circumference of the seal ring 71 at the stationary side of the second intermediate seal unit 7 or the seal ring 81 at the stationary side of the outside seal unit 8, and then is discharged from the discharge passage $FO_2$ or the discharge passage $FO_3$. Therefore, the sealed slide surfaces $7S$, $8S$ are cooled by the flow of the intermediate liquid C and lubricated. The slide load is effectively decreased. As a result, abrasion of the sealed slide surfaces $7S$, $8S$ and deformation by the slide heat generation is decreased. Further, decrement of the lifetime is reduced, which is caused from partial abrasion by unbalanced contact.

The flow of the intermediate liquid C, which is supplied into each chamber $Ch_1$~$Ch_3$, can be appropriately set by selecting a diameter of each orifice hole $23a$~$26a$ of the plugs 23~26.

The invention is not limited to the embodiment of FIG. 1 as above-described. For example, at an atmosphere side portion of the seal unit 8, further similar seal units can be added. Thus, one or more similar chamber(s) is/are added between the third chamber $Ch_3$ and the atmosphere A. As shown by a dashed line in FIG. 2, a pressure $P_n$ of the intermediate liquid, which is circulated and supplied to the added chamber, is set at an intermediate pressure which is between the internal pressure $P_3$ of the third chamber $Ch_3$ and the atmospheric pressure $P_A$ at the outside of the machine. Thereby the differential pressure, which acts on the seal unit 8 and the seal unit at the atmosphere side thereof, becomes further small. Therefore, high reliability can be achieved for the multistage shaft sealing apparatus.

Further, even if the internal pressure $P_1$ in the first chamber $Ch_1$ is equal to the pressure $P_B$ of the process liquid B in the machine, the intermediate liquid C in the first chamber $Ch_1$ is not mixed into the process liquid B in the machine, in theory. However, by lowering the internal pressure $P_1$ of the first chamber $Ch_1$ in comparison with the pressure $P_B$ of the process liquid B, it is possible to avoid mixing of the intermediate liquid C with the process liquid B in the machine. In addition, even if the internal pressure $P_2$ in the second chamber $Ch_2$ is equal to the pressure $P_B$ of the process liquid B in the machine, it is possible to avoid further leakage of the process liquid B, which may leak into the first chamber $Ch_1$. However, by raising the internal pressure $P_2$ in the second chamber $Ch_2$ in comparison with to the pressure $P_B$ of the process liquid B, reliability can be further improved.

According to a multistage shaft sealing apparatus of the invention the inside seal unit, the outside seal unit that contacts the atmosphere, and one or more pair of the intermediate seal units between the inside and outside seal units are arranged between the seal housing and the rotating shaft so as to be aligned in the axial direction. A plurality of chambers are bounded or defined by each seal unit. The pressure of fluid in at least two chambers among these seal units is maintained equal to or higher than the pressure of the fluid to be sealed in the machine. Therefore, even if one of the seal units is damaged, when one or more chambers are not damaged, it can be surely avoided that the fluid to be sealed is leaked to the atmosphere side.

According to a multistage shaft sealing apparatus of the invention the pressure in the chamber nearest to the atmosphere is maintained higher than the pressure of the atmosphere. Therefore, the differential pressure, which acts on the seal unit provided between the atmosphere and the outermost chamber nearest to the atmosphere, becomes smaller than the difference in pressure between the pressure of the second chamber and the atmospheric pressure. Here the pressure of the second chamber is maintained equal to or higher than that of the fluid to be sealed. Therefore, the surface pressure of the sealed slide surface becomes small. Abrasion and heat generation can be reduced.

According to a multistage shaft sealing apparatus of the invention the pressure in the innermost chamber nearest to the machine is maintained lower than the pressure of the fluid to be sealed in the machine. The pressure in the chamber second nearest to the machine is maintained equal to or higher than the pressure of fluid to be sealed in the machine. Therefore, the intermediate liquid in the chamber, which is located nearest to the machine, does not enter into the machine so as to pollute the fluid to be sealed. Even if the fluid to be sealed in the machine is leaked into the innermost chamber nearest to the machine, such leaked fluid is not further leaked into the chamber second nearest to the machine. Therefore, reliability of the seal can be remarkably improved.

What is claimed is:

1. A multistage shaft sealing apparatus comprising:
   a seal housing having an inner circumferential surface;
   a rotating shaft rotatably mounted and passing through an inside of the seal housing;
   an inside seal unit having a sealed slide surface portion and being provided at a side of fluid to be sealed in a machine;
   an outside seal unit having a sealed slide surface portion and being provided at a side of atmosphere, the inside seal unit and the outside seal unit being bounded between the seal housing and the rotating shaft;
   a plurality of intermediate seal units having a sealed slide surface portion and being located between the inside and the outside seal units;
   an intermediate liquid supply passage for supplying intermediate liquid in plural chambers including first, second and third chambers, which are bounded by the inside seal unit, the outside seal unit and the intermediate seal units;
   an intermediate liquid discharge passage for discharging the intermediate liquid from the chambers; and
   a plurality of plugs fixed at the inner circumferential surface of the seal housing, each of the plurality of plugs having an annular baffle plate integrally formed at an end of the plugs and protruding inwardly towards the rotating shaft for detouring the intermediate liquid so as to flow near the sealed slide surface portions in such a manner that the sealed slide surface portions are cooled and lubricated by the intermediate liquid;
   wherein pressures from a process liquid in the machine to the atmosphere at the outside of the machine are controlled by circulation and supply of the intermediate liquid, in such a manner that an internal pressure in the first chamber is maintained lower than a pressure of the process liquid in the machine, and an internal pressure in the second chamber is maintained higher than the pressure of the process liquid in the machine, and an internal pressure of the third chamber is maintained lower than the internal pressure in the second chamber and higher than the internal pressure of the process liquid.

2. The multistage shaft sealing apparatus as defined in claim 1, wherein the inside seal unit includes a non-rotating or stationary seal ring and a rotating seal ring which constitute the sealed slide surface portion, and each intermediate seal unit includes a non-rotating or stationary seal ring and a rotating seal ring which constitute the sealed slide surface portion, and the outside seal unit includes a non-rotating or stationary seal ring and a rotating seal ring which constitute the sealed slide surface portion.

3. The multistage shaft sealing apparatus as defined in claim 2, wherein an annular recess is formed at each outer end of the sealed slide surface portions so as to be positioned between the non-rotating or stationary seal ring and the rotating seal ring, wherein each of the baffle plates protrudes toward each recess.

4. The multistage shaft sealing apparatus as defined in claim 1, wherein each of the plugs has a substantially L-shape in cross-section.

5. The multistage shaft sealing apparatus as defined in claim 1, wherein the plugs and the inside, the outside and the intermediate seal units form axial flow passages through which the intermediate liquid flows in a substantially axial direction of the rotating shaft between a supply passage for the intermediate liquid and a discharge passage for the intermediate liquid.

* * * * *